2,971,844
METHOD FOR PREPARING LINDEN BLOSSOM TEA CONCENTRATE

Beatrice Bosanac, Washington, D.C.
(1430 S. 73rd St., West Allis 14, Wis.)

No Drawing. Filed June 29, 1959, Ser. No. 823,324

6 Claims. (Cl. 99—77)

This invention relates to the preparation of a concentrated tea extract prepared from linden blossoms which can be stored for long periods of time and can be easily employed by simple dilution with water to provide a beverage with the flavor and taste of freshly brewed linden blossom tea which is prepared with boiling water.

Linden blossom flowers or lime flowers have been used for many years in Central Europe, South America and elsewhere throughout the world as a base for infusion tea which is prescribed for its antispasmodic and soothing action.

Infusion tea from dried linden blossoms is mentioned for pharmaceutical use in the pharmaceutical registers or pharmacopoeiae of Belgium, Brazil, Germany, Finland, France, Italy, Yugoslovia, Mexico, the Netherlands, Portugal, Russia, Switzerland and Spain. The Italian pharmacopoeia includes some other varieties of Tilia besides the common winter linden and summer linden varieties.

Linden blossom tea is prescribed in these pharmacopoeiae as a relaxant and perspiration-inducing remedy with analgesic effect, for use against respiratory infections, stomach cramps, colics, diarrhea, and grippe and is added to mouth lotion or gargle solution, or to bath water. It is also used for cosmetic purposes as an ingredient of Aqua Tilia. In homeopathic medicine, lime blossoms are prescribed as a remedy for skin disorders.

Linden blossoms are preferably picked from the tree just as they burst into bloom (around the middle of June in Washington, D.C.). The light-green narrow leaf bract from the middle of which the flower grows and the blossoms are picked and dried.

The dried linden blossom as a base for infusion preparation is produced as an article of commerce in Austria, Northern Poland, Russia and in the Balkan countries. Perhaps the largest growth of trees are in the great linden forests along the Dnieper River in Russia. In commercial operations, the entire crop of blossoms is harvested during the blooming season and carefully dried in the shade. During drying, the preparation loses the very pleasing perfume given out by fresh lime blossoms.

To brew the tea a few tablespoons of the dried substance (comminuted if desired) are placed in a teapot and boiling water is added. After steeping for 10 minutes and straining it is served as any other tea. Mint flavor or fruit flavoring, sugar, etc., are added to suit the taste.

Linden blossom tea is essentially different in respect to its chemical composition and to its taste characteristics from the type of ordinary tea on the market which comes from the leaves of the tea tree, *Thea sinensis*. Tea leaves are green in color on the tree and become black due to processing after the leaves are plucked. Whether green or black, tea leaves owe their characteristic flavor to the constituents tannin for the astringent property, caffeine for the stimulating property, and tannin like oxidation products, e.g., polyphenols, catechols, etc., produced by enzymatic oxidation during withering, rolling and curing operations.

The linden blossom cluster is 6–8 cm. (2–3 inches) long, and enclosed to about half its length by a smooth, yellowish-green membranous, reticulated, tongue-shaped calyx. *Tilia cordata* (winter linden) has clusters of 5–15 blossoms. *Tilia platyphyllos* (summer linden) has clusters with 3–7 blossoms. In *Tilia platyphyllos* the blossoms are yellowish, somewhat darker in color, with 5 yellow, rather thick curving sepals clasped around the bud center, 5 smooth yellow, spatulated corollas containing nectar-secreting glands, 30–40 stamens arranged in groups of 5 with thready stalks and divided pistils. The seed bud is 5-celled, globular, and densely ciliated.

The odor of the pharmaceutical preparation is faintly spicy and aromatic (in contrast to the trade preparation called "silver lime" which often has a strongly aromatic odor). The taste is faintly spicy. Characteristic of the dried preparation are the fragments of greenish-yellow calyces, which are present in abundance. They are membranous, reticulated, smooth and rather stiff. In this form, i.e., the dried preparation, the petals are usually stained brown and extremely shriveled. The stamens are likewise brownish for the most part. Sometimes the fuzzy white seedbuds are recognizable also in the dried preparation.

The composition of linden blossoms is well established in the literature; see "Europaische Drogen" by Heinz A. Hoppe, vol. II, Hamburg, 1959, and "Die Pflanzenstaffe" by C. Wehmer, Second Edition, 1931. The blossoms contain an essential oil, principally farnesol, which is volatile, boiling under vacuum of about 10 millimeters of mercury at about 150–160° C. and is believed to be in the form of an ester. See German Patent No. 149,603 of 1904. The inorganic components present are potassium malate, potassium acid tartrate and calcium salts of organic acids such as calcium acetate, these alkali metal and alkaline earth salts constituting about 5–8% expressed as inorganic ash. Very small amounts of saponin, glycosides, pectin, mucin, tannin, sugars, ceresin wax and anthaxanthin, a yellow dyestuff, are also present.

Thus, ordinary tea contains about 25% of tannin (by dry weight) in fresh tea leaf (see Harler's Tea Culture and Marketing of Tea, page 89, Oxford University Press, 1933) to make the effect of tannin processing an important factor in taste, in dried linden blossoms or in the tea made therefrom, the amount of tannin present is so small as to permit substantially no beneficial effect upon flavor whether the linden blossoms or tea is processed by chemical oxidation or by chemical reduction or by enzymatic oxidation or by enzymatic reduction.

It has been discovered that by concentrating a linden blossom aqueous brew under a vacuum of less than 100 millimeters, preferably less than 20 millimeters, at a temperature of about 125° F. or below and filtering the concentrated residue at a point when the organic acid salts of calcium and potassium begin to crystallize, that there is separated about 15–40% of these alkali metal salts from the concentrate. The liquid concentrate freed from these salts is thereafter easily reconstituted in hot or cold water and is free from the flat taste which characterizes the reconstituted brew made by vacuum concentration without the filtering step. However, the flowery aroma is absent from the reconstituted brew made from the concentrate.

A linden blossom brew of satisfactory flavor and aroma when freshly brewed could not be concentrated at room temperature and the boiling point of water to provide a product which could be diluted with hot or cold water to match the flavor and aroma of the fresh brew. If the fresh linden blossom brew is concentrated under vacuum at a temperature of 125° F. to the point of dryness and the dry residue reconstituted with hot water, it is found that a clear, full flavored brew is not obtained and an insoluble inorganic residue is left.

The volatile flavoring agent appears to be eliminated during atmospheric pressure concentration and a flat objectionable flavor is noted which is absent from the fresh brew. It appears to be essential that the flowery aromatic characteristic of freshly brewed tea be retained in the concentrate in order to obtain a reconstituted beverage from a concentrate to match the flavor and aroma of the fresh brew.

It has been found that by separating the essential oil by a first steam distillation procedure which is carried out to collect a condensate fraction of small volume in a manner which is well known in the art that the flat flavor can be eliminated.

The invention thus contemplates a two-step brewing procedure in which (1) dried linden blossoms and dried leaf bracts attached to the blossoms are subjected to steam distillation to recover the volatile essence of the blossoms (a suitable apparatus for recovering this volatile flavor component is described in patent to Milleville, 2,457,315, and the vacuum distillation procedure in the presence of steam may also be used) and (2) brewing the blossom and leaf residue with from about 12–25 times the weight of water at a temperature of 190–212° F.

In accordance with the invention the aqueous brew extract from the second step which is free from volatile oil is concentrated to a point that alkali metal salts begin to crystallize. This point of crystallizing is very easily determined by observing the formation of a yellow-white precipitate in the concentrate. The precipitate as soon as it is formed represents from about 3 to about 10% of the weight of the residue liquid at this point of crystallization.

After separation of the precipitate, the recovered volatile oil is added to the filtrate and the mixture may then be further evaporated under vacuum to the desired level of concentration in either liquid form or may be concentrated to the point of dryness.

To illustrate the unsatisfactory effect of minor amounts of oxidizing agents upon the flavor and color of linden blossom tea a series of tests were carried out to determine the effect of 3% of hydrogen peroxide solution, oxygen (air bubbled in) and potassium permanganate. All of the samples in the determination including control samples to which no chemicals were added utilized the same amount of dried linden blossoms, e.g., one heaping teaspoon full to one cup of hot water.

At a level of 2 to 4 drops of 3% hydrogen peroxide solution the tea darkened from a slight amber to a medium amber color. Upon evaporation of the tea at boiling temperature of the water, the flowery aroma quickly disappeared and the color darkened to a deep amber.

Upon repeating the tests but evaporating the tea under vacuum at 125° F., the concentrate darkened and the flowery aroma disappeared.

In the case of potassium permanganate, two drops of a 1% solution added to the tea was sufficient to develop an unpalatable bitter taste. The tea brewed for 10–20 minutes was flat. The flavor became worse and the tea after preparing a concentrate under vacuum at 125° F. was in no way satisfactory as a beverage upon dissolution with hot or cold water, even if the bitter flavor was masked with flavoring agents such as lemon oil, lime oil, strawberry flavoring, etc.

By bubbling oxygen in the form of air through the brew during concentration under vacuum, a bitter and flat taste also develops.

By using a reducing agent such as sodium bisulfite or sodium sulfite in an amount of 0.01–0.3% of the brew, undesirable flat flavor and bitter flavor develop.

A simple and convenient measure of the strength of the concentrate is had by comparing the volume of the concentrate with the volume which would be had utilizing the same amount of dried linden blossoms for fresh hot brew. Thus, a hot infusion of linden blossoms as recommended in "Potter's New Cyclopaedia of Botanical Drugs and Preparations" is prepared from 1 dram of the dried blossoms in 1 pint of boiling water for use as a nervine, stimulant or tonic.

In practice the dose is frequently doubled, e.g., about 8 grams of dried blossoms (2 teaspoonfuls) per pint of boiling water. These ratios are observed in large scale operation so that the total amount of water used for steam distillation and brewing prior to concentration is preferably not more than 200 pints of water per pound of dried blossoms and is preferably about 120 to 160 pints of water per pound.

The extraction of the blossom residue after separation of volatile oils is preferably carried out with addition of small incremental portions of boiling water while stirring the leaf residue so that the temperature of the residue is about 25–30° F. less than the temperature of the boiling water. In this manner undesirable bitter components are not transferred by hot water leaching into the brew for concentration.

In the form of a dry product, the concentrate from linden blossoms of the invention may be dried at a temperature less than 115° F. to a film which is flaked rather than as a powder, using known drying equipment for heat sensitive liquids. The film is of light colored, glossy and translucent and is stable in storage at room temperature for long periods of time. The dried product in the form of powder may be shaped into pellets or granules using commercial pelleting equipment.

In this form of film, powder, or pellets, the dry product from 1 pound of tea leaves amounts to about 25–40 grams and is suitable to produce about 140–160 cups of full flavored tea.

The aroma of the reconstituted tea may be further improved, if, instead of using vacuum drying procedures to form the dry product, a quick freezing process is employed to produce small frozen pellets, amber in color, which are placed under high vacuum (2–10 millimeters of mercury) in a glass lined evaporator and allowed to thaw while being slowly agitated. This procedure permits concentration of the soluble product at a temperature of less than 50° F. and conserves the essential oil ingredient which is essential for the flowery bouquet of the reconstituted beverage.

If desired infra-red freeze drying equipment may be used to concentrate the frozen pellets, care being taken that heating of the pellets does not carry the temperature above 50° F.

Prior to subjecting the filtered concentrate (partially de-ashed) to further vacuum concentration or to vacuum freeze drying, it is frequently advantageous to incorporate flavoring agent of the type and in amounts as would be used for flavoring freshly brewed tea. Thus, such flavoring agents as raspberry syrup, cherry syrup, compound sarsaparilla syrup, syrup of cloves, cinnamon syrup, licorice elixir, aromatic elixir, lemon tincture, lime tincture, orange peel tincture (sweet and bitter), peppermint spirit and spearmint spirit may be used. Preferred flavoring agents from the point of view of custom and usage are lemon, lime and the mint flavorings.

It is helpful to also add a small amount of water soluble colloid which aids in reconstituting the concentrate by dilution with hot or cold water. Water soluble dispersing colloids such as sodium pectinate, potassium pectinate, sodium alginate, agar agar and gelatin may be employed in amounts of about 0.1–1.0% by weight of the dry concentrate.

These colloids are typical of edible, tasteless, odorless and colorless binders which may be used to aid in providing dry products having enhanced rate of solubility in hot or cold water upon dissolving the dry concentrate or reconstituting the linden blossom tea beverage.

It may be desirable in certain cases to grind the dried linden blossoms, preferably in a refrigerated mill, to a suitable degree of fineness, in the order of one-half square millimeter to permit ready water extraction.

The finished concentrated product may also be in the form of extracts, syrups and dry concentrates to be used in preparing hot or cold drinks as well as carbonated soda fountain and beverage dispenser drinks or carbonated and still (non-carbonated) bottled drinks.

The following example illustrates the manner in which the invention may be carried out:

*Example I*

One part of dry linden blossoms is subjected to steam distillation under vacuum at about 10–20 millimeters of mercury and there is collected 0.04 part of volatile oil in the steam distillate. The temperature used for steam distillation under vacuum is kept below 150° F.

Small amounts of water are added to the extracted linden blossom residue to provide a total of about 175 parts of water per part of linden blossoms (dry weight basis). The temperature of the water is brought to 190° F. before it is added to the residue. The blossom and leaf residue is separated by filtration and the filtrate is subjected to vacuum evaporation.

The concentration is carried out under vacuum of 5–10 millimeters of mercury and at a temperature of 125° F. to the point where the amber liquid starts to show crystallization of inorganic salts, the color turning from deep amber to light yellow. The salts are separated by filtration and the volatile oil recovered by steam distillation is added to the filtrate which is evaporated to a syrupy stage. To the syrup is added concentrated lemon juice and about 1% by volume of soluble agar agar. The product is evaporated to dryness and formed as tablets which are soluble in hot or cold water and provide the taste and aroma characteristics of freshly brewed tea.

In the foregoing example, the brewing extraction of the leaf of the blossom residue from steam distillation may be carried out with from about 12–25 times the weight of hot water. The temperature during concentration may vary between about 100° F. to about 125° F. The amount of alkali metal and alkaline earth salt which is removed is at least about two grams per 100 grams of concentrate.

From the foregoing it is seen that the process of the invention is thus directed to the preparation of a linden blossom tea extract by the steps of (a) steam distilling the dried linden blossoms at essentially the boiling temperature of water and recovering by condensing an essential-oil containing steam distillate amounting to about 1/25 of the weight of the dried blossom, (b) extracting the blossom residue from steam distillation with about 12–25 times the weight of said residue with hot water at a temperature of 190–212° F., concentrating said water extract under vacuum below a temperature of about 125° F., preferably between about 100° F.–125° F. until inorganic solids appear in the concentrate, (c) cooling to a temperature of about 75–100° F. and filtering said concentrate to remove at least about 2 grams of alkali metal and alkaline earth salt per 100 grams of said concentrate and (d) combining the filtrate from (c) with the essential oil distillate from (a) whereafter the product is further concentrated for use in liquid form or for use in dry form.

The concentrate is specifically designed to provide a uniform brew of linden blossom tea for users who prefer this tea as a beverage and for users who wish to employ the domestic remedy for its prescribed therapeutic uses.

Due to the heat treatment during initial extraction of volatiles of the boiling point of water, the concentrate is free from micro-organisms causing spoilage. However, if there is a possibility that contamination might occur, the concentrated product is pasteurized prior to filling in jars, cans or other containers which are hermetically sealed. Keeping qualities may be aided for certain types of storage by addition of sugar. However, it is to be understood that sugar-free concentrates may also be preferred for taste.

Having thus defined the invention, what is claimed is:

1. A method for preparing linden blossom tea concentrate from dried linden blossom leaves comprising (a) steam distilling said dried blossoms under diminished pressure at a temperature below 150° F. to recover an essential oil containing distilland, (b) extracting the blossom residue from steam distillation with about 12–25 times the weight of said residue with hot water at a temperature of 190–212° F., (c) concentrating said water extract under vacuum between about 100–125° F. until inorganic solids appear in the concentrate, (d) filtering said concentrate to remove at least about 2 grams of alkali metal and alkaline earth salt per 100 grams of said concentrate and (e) combining the filtrate from (d) with the essential oil distillate from (a) whereafter the product is further concentrated.

2. A method as recited in claim 1 wherein said water extract is concentrated under a vacuum of about 5–10 millimeters of mercury.

3. A method as claimed in claim 1 wherein a flavoring agent is added to said concentrate and the product is concentrated to a dry state.

4. A method as claimed in claim 1 wherein an edible water-soluble dispersing colloid is added to said concentrate and the product is concentrated to a dry state.

5. A method as claimed in claim 3 in which said dry product is shaped into a tablet.

6. A method as claimed in claim 4 in which said dry product is shaped into a tablet.

References Cited in the file of this patent

UNITED STATES PATENTS

| | | |
|---|---|---|
| 2,457,315 | Milleville | Dec. 28, 1948 |
| 2,476,072 | Tressler | July 12, 1949 |
| 2,513,813 | Milleville | July 4, 1950 |
| 2,891,865 | Seltzet et al. | June 23, 1959 |
| 2,891,866 | Schroeder | June 23, 1959 |

FOREIGN PATENTS

| | | |
|---|---|---|
| 8,525 | Great Britain | of 1898 |

OTHER REFERENCES

"U.S. Dispensatory," 23rd edition (1943), by Wood and Osol, page 1560.